(12) United States Patent
Kipnis

(10) Patent No.: US 9,188,351 B1
(45) Date of Patent: Nov. 17, 2015

(54) NON-TOXIC FOOD GRADE PLASTIC HUMIDIFIER, A KIT OF COMPONENTS, AND METHODS OF MAKING AND USING SAME

(71) Applicant: Arkady Kipnis, Castaic, CA (US)

(72) Inventor: Arkady Kipnis, Castaic, CA (US)

(*) Notice: Subject to any disclaimer, the term of this patent is extended or adjusted under 35 U.S.C. 154(b) by 316 days.

(21) Appl. No.: 13/790,564

(22) Filed: Mar. 8, 2013

(51) Int. Cl.
- F24F 6/04 (2006.01)
- A23L 1/00 (2006.01)
- A24F 25/00 (2006.01)

(52) U.S. Cl.
CPC .............. F24F 6/04 (2013.01); *A23L 1/0008* (2013.01); *A24F 25/00* (2013.01)

(58) Field of Classification Search
CPC ........................................................ A47J 27/04
USPC ........................................ 261/74, 104, 107
See application file for complete search history.

(56) References Cited

U.S. PATENT DOCUMENTS

| | | | | |
|---|---|---|---|---|
| 2,767,018 A | * | 10/1956 | McDonald | 239/34 |
| 3,801,011 A | * | 4/1974 | Guehler et al. | 239/34 |
| 4,997,082 A | | 3/1991 | Durocher | |
| 5,934,773 A | * | 8/1999 | Ferrell | 312/31.1 |
| 5,937,554 A | | 8/1999 | Haugk et al. | |
| 5,938,012 A | | 8/1999 | Yeager et al. | |
| 6,148,875 A | | 11/2000 | Breen | |
| 6,251,344 B1 | | 6/2001 | Goldstein | |
| D491,255 S | | 6/2004 | Glucksman et al. | |

FOREIGN PATENT DOCUMENTS

| | | |
|---|---|---|
| EP | 0 560 578 A1 | 9/1993 |
| EP | 0 890 317 A1 | 1/1999 |
| EP | 2259987 B1 | 12/2010 |
| WO | WO 00/10695 | 3/2000 |
| WO | WO 2008/148701 A1 | 12/2008 |

\* cited by examiner

*Primary Examiner* — Duane Smith
*Assistant Examiner* — Adam W Bergfelder
(74) *Attorney, Agent, or Firm* — Weiner & Burt, P.C; Irving M. Weiner; Pamela S. Burt

(57) ABSTRACT

A humidifier having two non-toxic food grade plastic half members. One half member is solid, and the other half member has a screen to release moisture contained inside. A cotton membrane member is sandwiched between the half members and has distilled water introduced into it.

16 Claims, 10 Drawing Sheets

NON-TOXIC FOOD GRADE PLASTIC HUMIDIFIER, A KIT OF COMPONENTS, AND METHODS OF MAKING AND USING SAME

CROSS-REFERENCE TO RELATED APPLICATIONS

Not applicable

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

The present invention relates to a non-toxic food grade plastic humidifier, a kit of components including the humidifier, and methods of making and using same.

More particularly, the present invention relates to a non-toxic food grade plastic humidifier having an all natural membrane device squeezed between a first non-toxic food grade plastic member and a second non-toxic food grade plastic member, a kit of components including the humidifier, and methods of making and using same.

It is a desideratum of the present invention to avoid the animadversions of conventional and present devices, and at the same time to provide a very convenient and easy to use non-toxic food grade plastic humidifier, a kit of components including the humidifier, and methods of making and using same.

SUMMARY OF THE INVENTION

The present invention provides a non-toxic food grade plastic humidifier, comprising, in combination: a first non-toxic food grade plastic member; a second non-toxic food grade plastic member; said first non-toxic food grade plastic member and said second non-toxic food grade plastic member forming a non-toxic food grade plastic humidifier cartridge; an all natural membrane device disposed between said first non-toxic food grade plastic member and said second non-toxic food grade plastic member; said first non-toxic food grade plastic member is solid and is provided with a Velcro device for attaching said non-toxic food grade plastic humidifier cartridge to an external glass or plastic container which is sealable; distilled water introduced into said all natural membrane device; and said second non-toxic food grade plastic member is provided with a plurality of apertures therethrough for releasing moisture therethrough from said distilled water in said all natural membrane device within said non-toxic food grade plastic humidifier cartridge.

The present invention also provides a method of using a non-toxic food grade plastic humidifier, comprising, in combination: a first non-toxic food grade plastic member; a second non-toxic food grade plastic member; said first non-toxic food grade plastic member and said second non-toxic food grade plastic member forming a non-toxic food grade plastic humidifier cartridge; an all natural membrane device disposed between said first non-toxic food grade plastic member and said second non-toxic food grade plastic member; said first non-toxic food grade plastic member is solid and is provided with a Velcro device for attaching said non-toxic food grade humidifier cartridge to an external glass or plastic container which is sealable; distilled water introduced into said all natural membrane device; and said second non-toxic food grade plastic member is provided with a plurality of apertures therethrough for releasing moisture therethrough from said distilled water in said all natural membrane device within said non-toxic food grade plastic humidifier cartridge; wherein said method comprises the steps of: introducing said distilled water into said all natural membrane device; placing a dried product in said external sealable container; mounting said non-toxic food grade plastic humidifier in said external sealable container; maintaining said non-toxic food grade plastic humidifier inside said external sealable container until said product is moist enough for the liking of an user; removing said non-toxic food grade plastic humidifier from said external sealable container; air drying said non-toxic food grade plastic humidifier; and repeating the foregoing steps as desired.

The invention also provides a kit of components, comprising: a kit container holding the following items; a non-toxic food grade plastic humidifier comprising: a first non-toxic food grade plastic member; a second non-toxic food grade plastic member; said first non-toxic food grade plastic member and said second non-toxic food grade plastic member forming a non-toxic food grade plastic humidifier cartridge; an all natural membrane device disposed between said first non-toxic food grade plastic member and said second non-toxic food grade plastic member; said first non-toxic food grade plastic member is solid and is provided with a Velcro device for attaching said non-toxic food grade humidifier cartridge to an external glass or plastic container which is sealable; and said second non-toxic food grade plastic member is provided with a plurality of apertures therethrough for releasing moisture therethrough from distilled water in said all natural membrane device within said non-toxic food grade plastic humidifier cartridge; a pipette for injecting distilled water into said all natural membrane; and an instruction sheet for giving an user instructions for using said kit of components.

An object of the invention is to provide a non-toxic food grade plastic humidifier as described hereinabove, wherein said external sealable container comprises a prescription pill bottle.

Another object is to provide such a humidifier wherein said external sealable container comprises a zip lock bag.

A further object is to provide such a humidifier wherein said external sealable container comprises a pipe tobacco jar.

Another object is to provide such a humidifier, and including a pipette for introducing said distilled water into said all natural membrane device.

A further object is to provide such a humidifier, wherein said second non-toxic food grade plastic member is provided with a screen member for releasing moisture therethrough from said distilled water in said all natural membrane device within said non-toxic food grade plastic humidifier cartridge.

Yet another object is to provide such a humidifier wherein said all natural membrane device is squeezed between said first non-toxic food grade plastic member and said second non-toxic food grade plastic member.

A further object is to provide a method as described hereinabove including the step of injecting said distilled water into said all natural membrane device using a pipette.

Another object is to provide such a method including the step of soaking said non-toxic food grade plastic humidifier cartridge in distilled water in an external dish with said second non-toxic food grade plastic member facing downwardly so that said plurality of apertures contact the distilled water.

A further object is to provide such a method wherein said second non-toxic food grade plastic member is provided with a screen member for releasing moisture therethrough from said distilled water in said all natural membrane device within said non-toxic food grade plastic humidifier cartridge, and including the step of soaking said non-toxic food grade plastic humidifier cartridge in distilled water in an external dish with said screen member facing downwardly so that said screen member contacts the distilled water in the external dish.

Another object is to provide a kit of components as described hereinabove wherein said second non-toxic food grade plastic member is provided with a screen member for releasing moisture therethrough from said distilled water in said all natural membrane device within said non-toxic food grade plastic humidifier cartridge.

Other objects, advantages, and features of the present invention will become apparent to those persons skilled in this particular area of technology and to other persons after having been exposed to the present patent application when read in conjunction with the accompanying patent drawings.

DETAILED DESCRIPTION OF THE INVENTION

Figure 1:
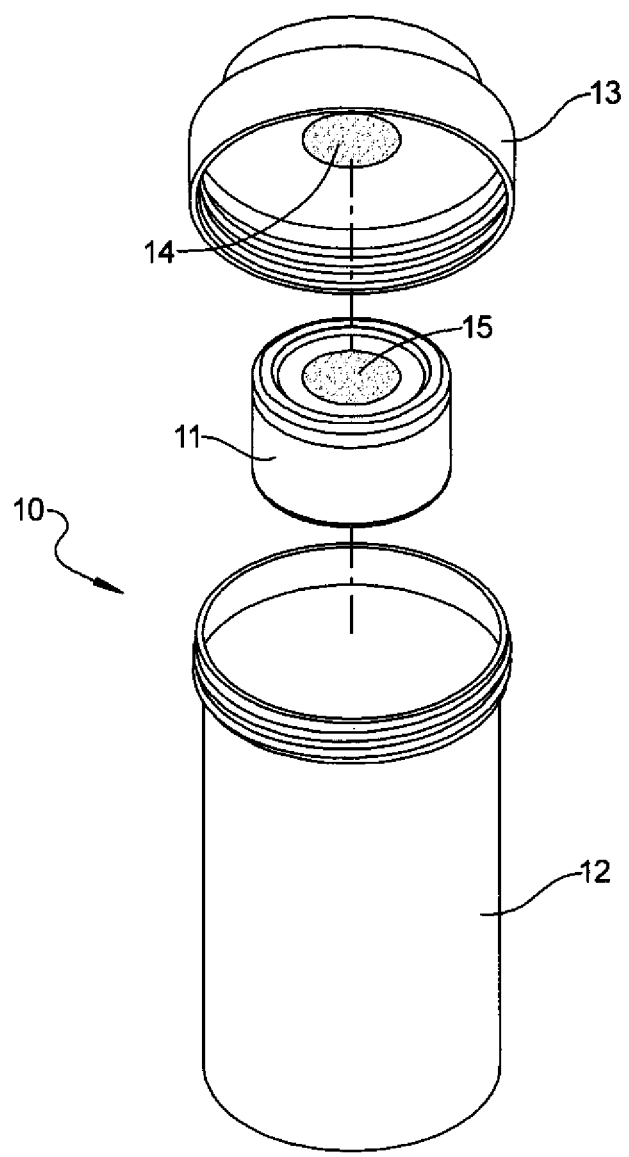
FIG. 1 is a perspective view of a prescription pill bottle having therein a humidifier in accordance with the present invention.

With reference to FIG. 1, there is shown a prescription pill bottle 10 having therein a non-toxic food grade plastic humidifier 11 in accordance with the invention.

The bottle 10 has a main part 12 and a sealable cap 13.

The humidifier 11 has a Velcro or other hook and loop device 16 including Velcro parts 14 and 15.

Velcro part 14 is affixed to the cap 13.

Velcro part 14 mates with Velcro part 15 to enable the humidifier 11 to be removable secured to the cap 13.

Figure 2:
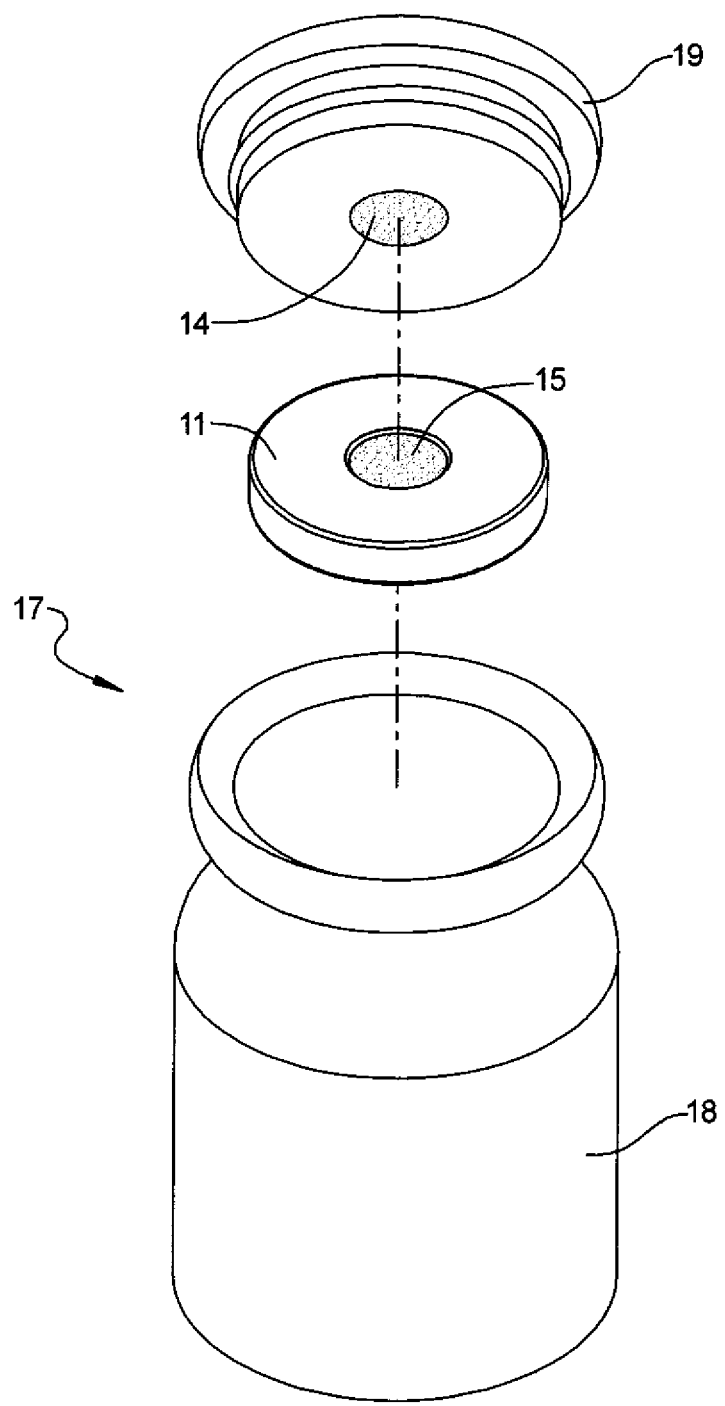
FIG. 2 is a perspective view of a tobacco jar having therein a humidifier in accordance with the present invention.

With reference to FIG. 2, there is shown a tobacco jar 17 having therein a non-toxic food grade plastic humidifier 11 in accordance with the invention.

The jar 17 has a main part 18 and a sealable cap 19.

The humidifier 11 has a Velcro device 16 including Velcro parts 14 and 15.

Velcro part 14 is affixed to the cap 19.

Velcro part 14 mates with Velcro part 15 to enable the humidifier 11 to be removable secured to the cap 19.

Figure 3:
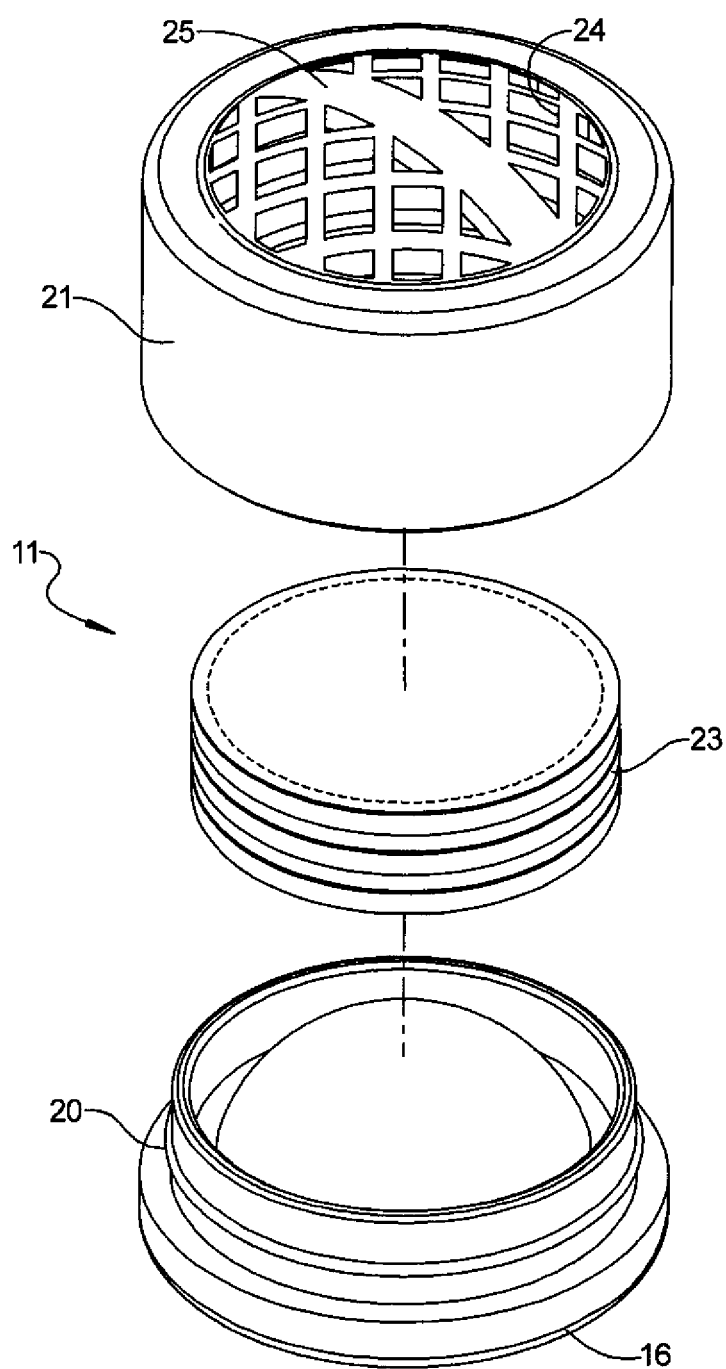
FIG. 3 is an exploded view of a first embodiment of the invention.

FIG. 3 is an exploded view of a first embodiment of the invention.

FIG. 3 shows a non-toxic food grade plastic humidifier 11 including a first non-toxic food grade plastic member 20 and a second non-toxic food grade plastic member 21.

Figure 5:
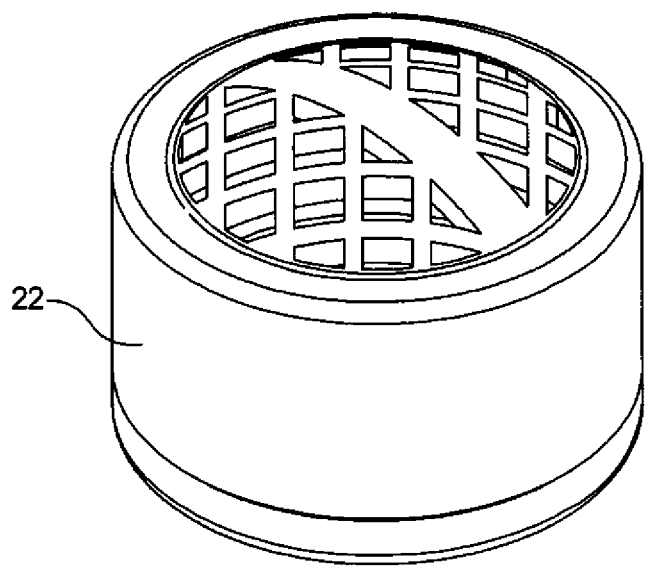
FIG. 5 shows the embodiment of FIG. 3 assembled.

The first non-toxic food grade plastic member 20 and the second non-toxic food grade plastic member 21 form a non-toxic food grade plastic humidifier cartridge 22 (shown in FIG. 5).

An all natural membrane device 23, including a cotton membrane, is disposed between said first non-toxic food grade plastic member 20 and said second non-toxic food grade plastic member The first non-toxic food grade plastic member 20 is solid and is provided with a Velcro device 16 for attaching said non-toxic food grade plastic humidifier cartridge 22 to an external glass or plastic container 10, 17, 27, 28 or 31 which is sealable.

Distilled water is introduced into said all natural membrane device 23.

The second non-toxic food grade plastic member 21 is provided with a plurality of apertures 24 therethrough or a screen member 25 for releasing moisture therethrough from said distilled water in said all natural membrane device 23 within said non-toxic food grade plastic humidifier cartridge 22.

Figure 4:
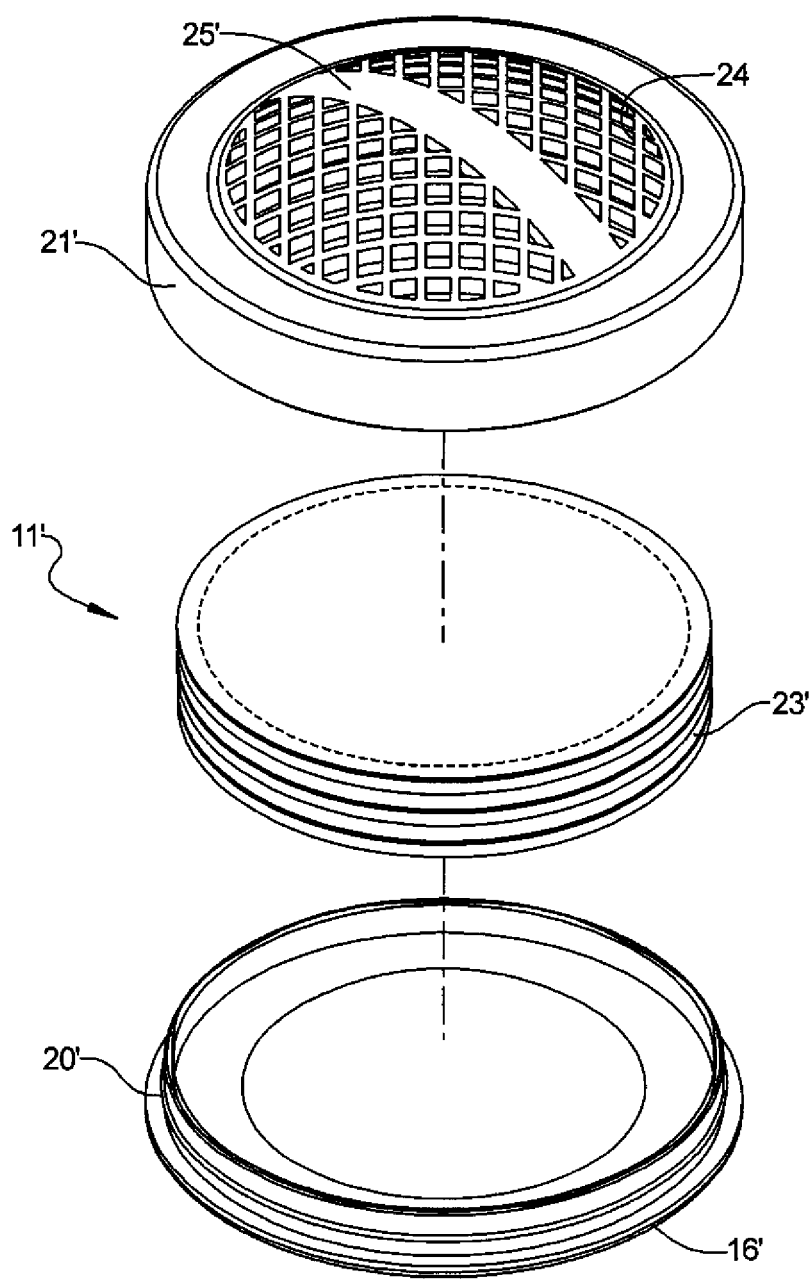
FIG. 4 is an exploded view of a second embodiment of the invention.

FIG. 4 is an exploded view of a second embodiment of the invention.

FIG. 3 shows a non-toxic food grade plastic humidifier 11' including a first non-toxic food grade plastic member 20' and a second non-toxic food grade plastic member 21'.

Figure 6:
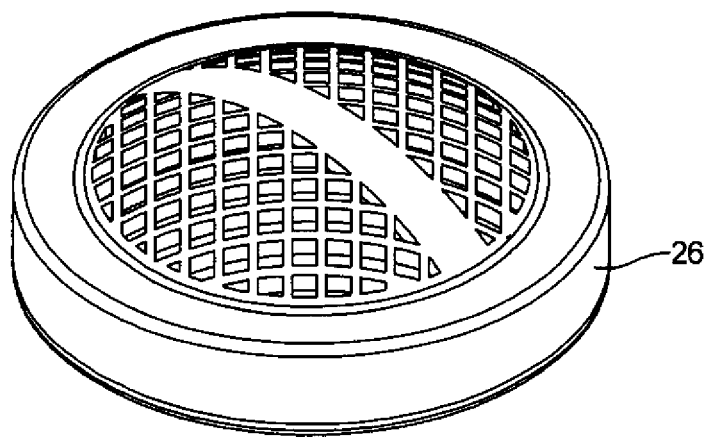
FIG. 6 shows the embodiment of FIG. 4 assembled.

The first non-toxic food grade plastic member 20 and the second non-toxic food grade plastic member 21' form a non-toxic food grade plastic humidifier cartridge 26 (shown in FIG. 6).

An all natural membrane device 23' is disposed between said first non-toxic food grade plastic member 20' and said second non-toxic food grade plastic member 22'.

Said first non-toxic food grade plastic member 20' is solid and is provided with a Velcro device 16' for attaching said non-toxic food grade plastic humidifier cartridge 26 to an external glass or plastic container 10, 17 which is sealable.

Distilled water is introduced into said all natural membrane device 23'.

The second non-toxic food grade plastic member 21' is provided with a plurality of apertures 24' therethrough or a screen member 25' for releasing moisture therethrough from said distilled water in said all natural membrane device 23' within said non-toxic food grade plastic humidifier cartridge 26.

Figure 7:
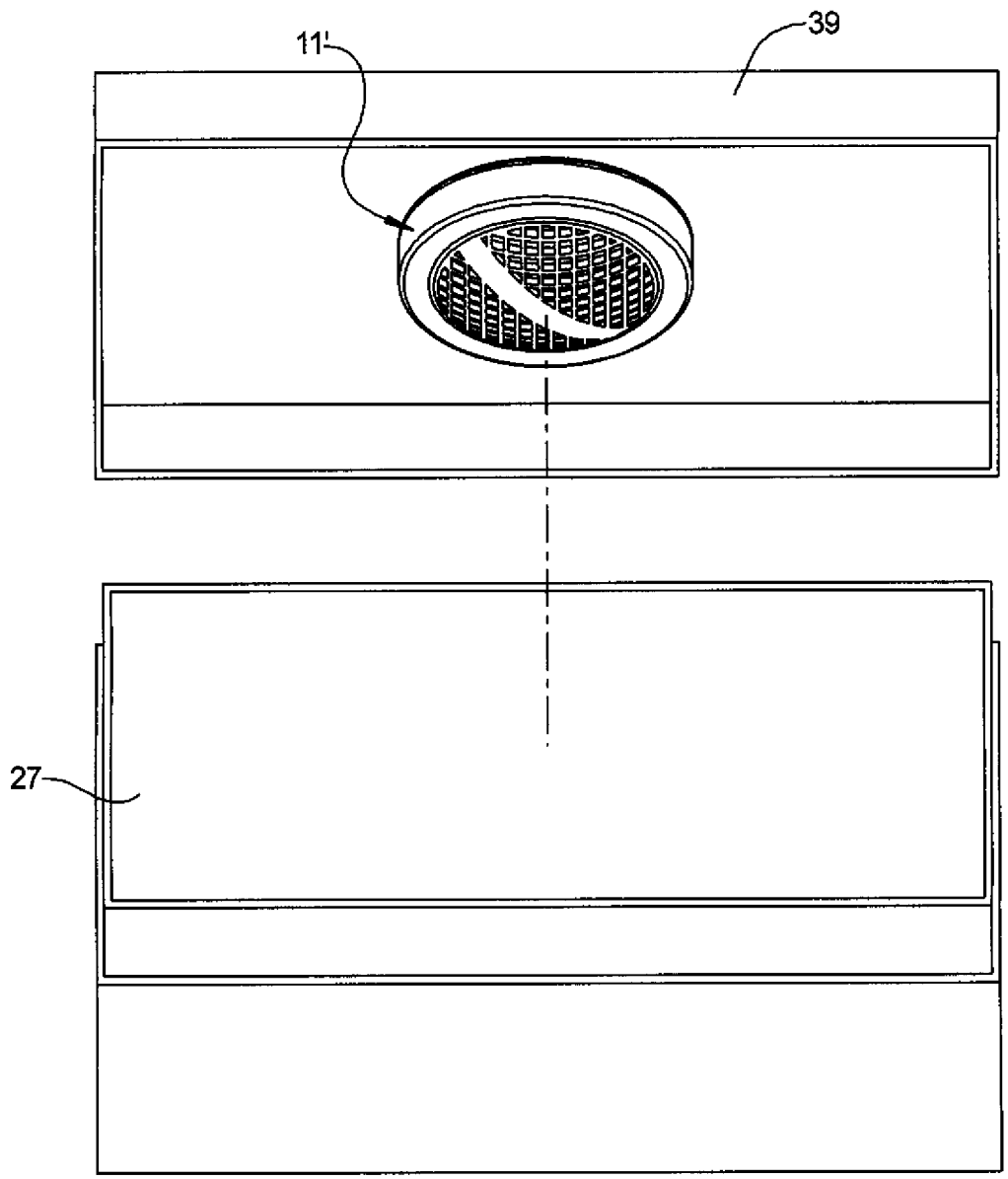
FIG. 7 shows the humidifier attached to the lid of plastic sealable container.

FIG. 7 shows the humidifier 11' attached to the lid 39 a of plastic sealable container 27.

Figure 8:
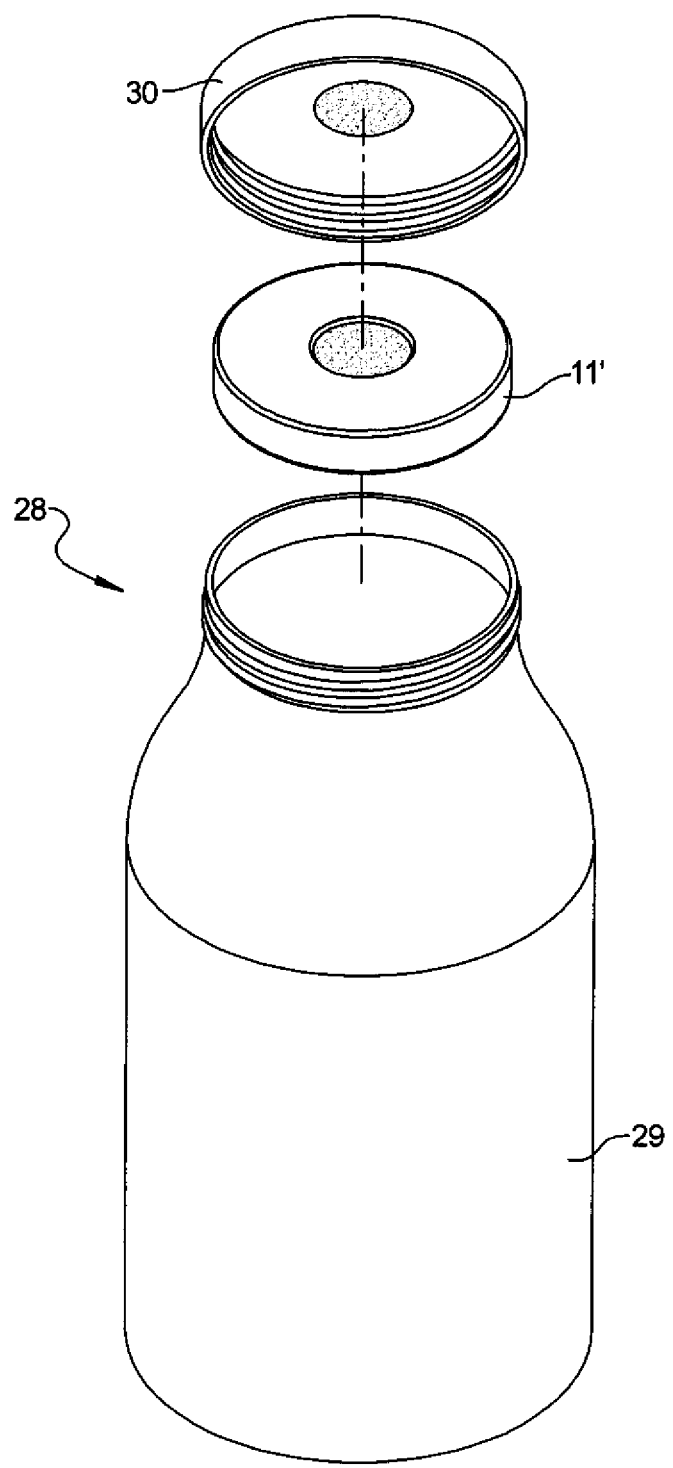
FIG. 8 is a perspective view of a glass jar having therein a humidifier in accordance with the present invention.

With reference to FIG. 8, there is shown a glass bottle 28 having therein a non-toxic food grade plastic humidifier 11' in accordance with the invention.

The bottle 28 has a main part 29 and a sealable cap 30.

The humidifier 11' has a Velcro device 16' including Velcro parts 14' and 15'.

Velcro part 14' is affixed to the cap 30.

Velcro part 14' mates with Velcro part 15' to enable the humidifier 11' to be removable secured to the cap 30.

Figure 9:
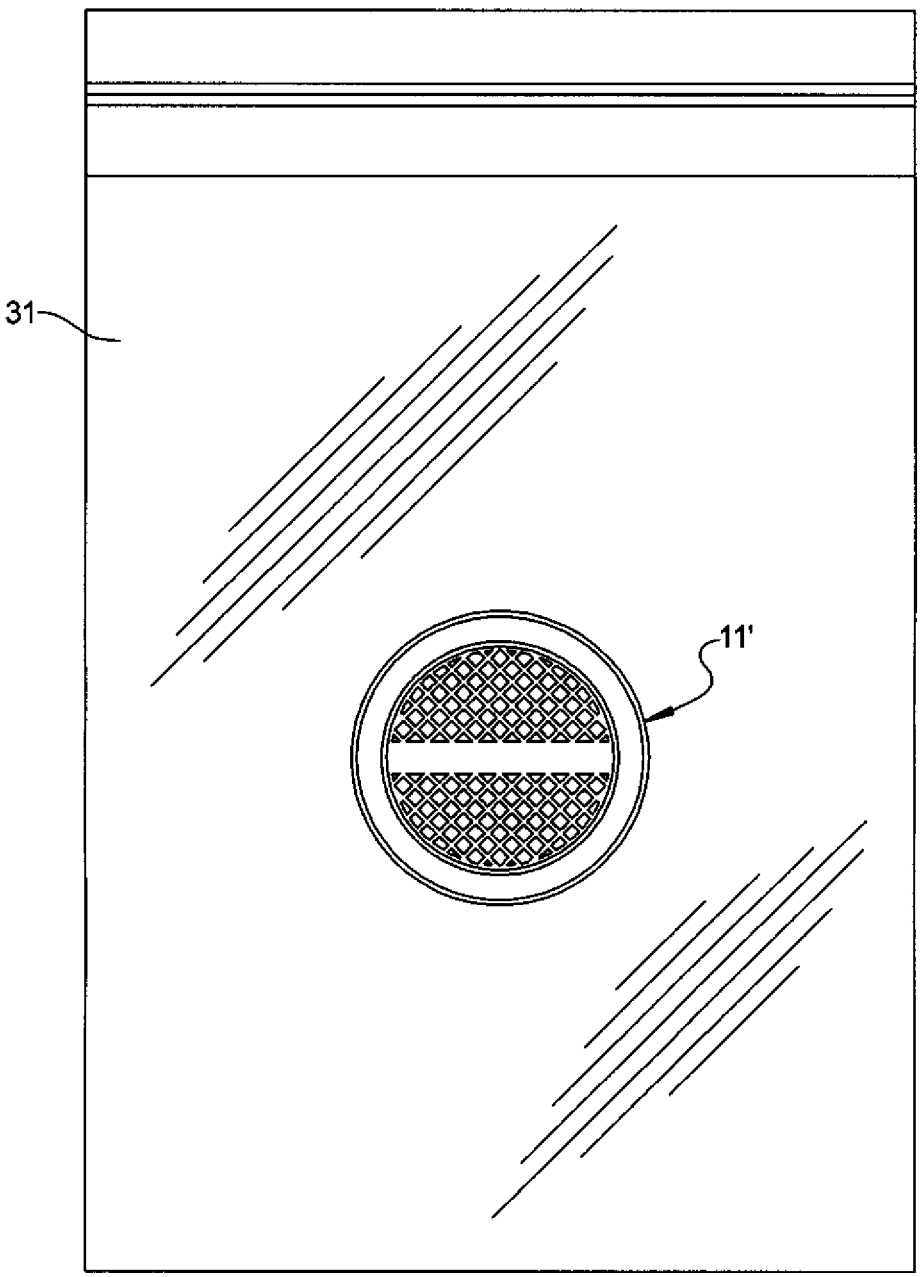
FIG. 9 shows a sealable zip lock bag having the humidifier therein.

FIG. 9 shows a sealable zip lock bag 31 having the humidifier1 1 or 11' therein.

Figure 10:
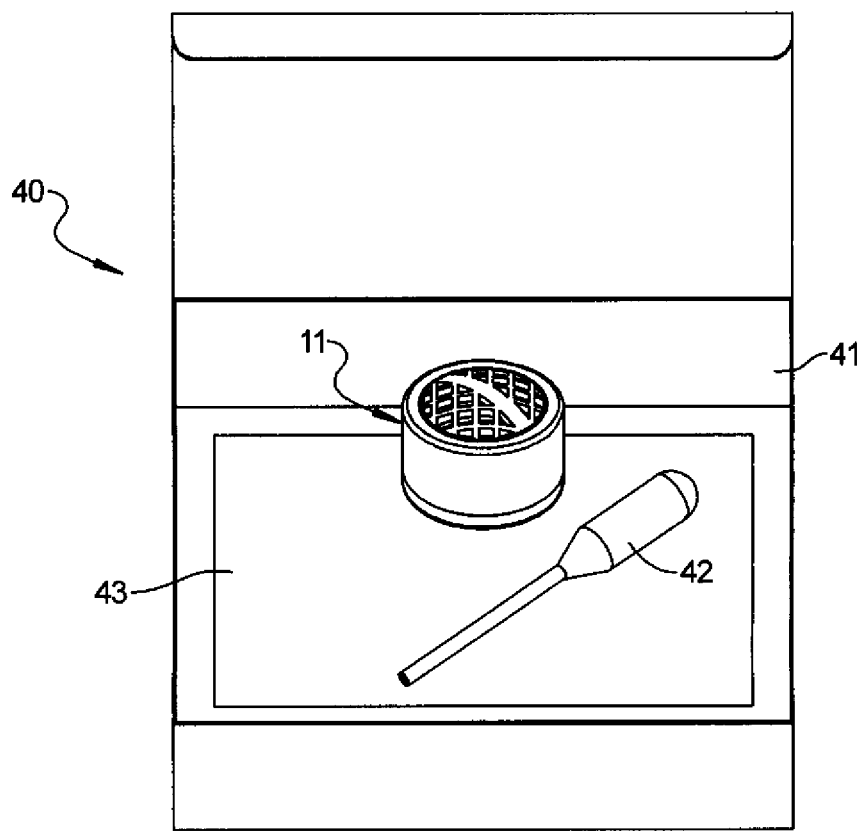
FIG. 10 shows a kit of components in accordance with the invention.

FIG. 10 shows a kit of components 40 in accordance with the invention.

The kit of components 40, comprises:

a kit container 41 holding the following items;

a non-toxic food grade plastic humidifier 11 or 11' comprising: a first non-toxic food grade plastic member 20; a second non-toxic food grade plastic member 21; said first non-toxic food grade plastic member and said second non-toxic food grade plastic member forming a non-toxic food grade plastic humidifier cartridge 22; an all natural membrane device 23 disposed between said first non-toxic food grade plastic member and said second non-toxic food grade plastic member; said first non-toxic food grade plastic member is solid and is provided with a Velcro device 16 for attaching said non-toxic food grade humidifier cartridge to an external glass or plastic container which is sealable; and said second non-toxic food grade plastic member is provided with a plurality of apertures therethrough or a screen member for releasing moisture therethrough from distilled water in said all natural membrane device within said non-toxic food grade plastic humidifier cartridge; a pipette 42 for injecting distilled water into said all natural membrane device 23; and an instruction sheet 43 for giving an user instructions for using said kit of components.

Figure 11:
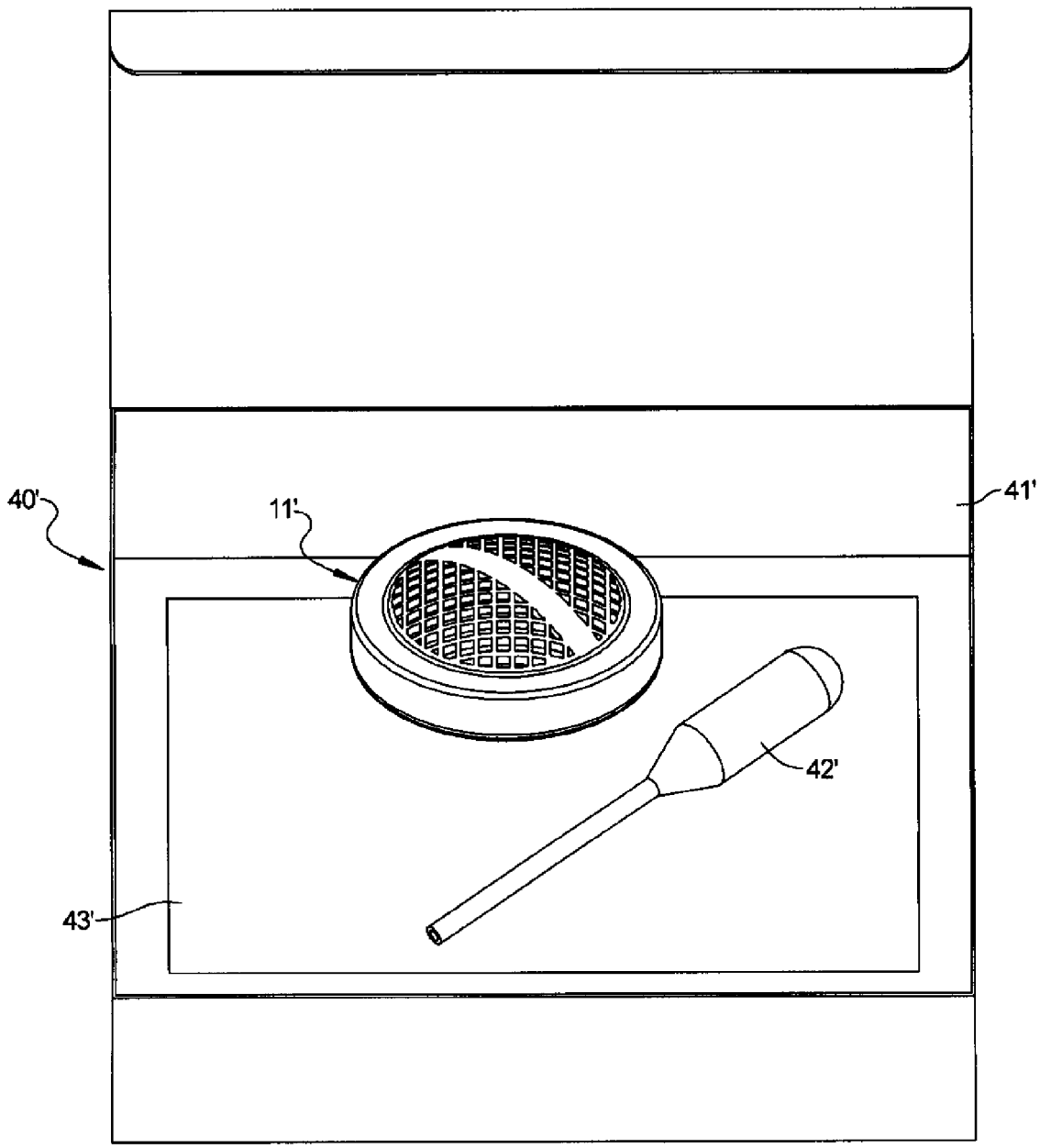
FIG. 11 shows a second kit of components in accordance with the invention.

FIG. 11 shows a second kit of components 40' including: a kit container 41' holding the following items; a non-toxic food grade plastic humidifier 11; a pipette 42' for injecting distilled water into said all natural membrane device 23; and an instruction sheet 43' for giving an user instructions for using said kit of components 40'.

The invention also provides a method of using a non-toxic food grade plastic humidifier, comprising, in combination:

a first non-toxic food grade plastic member;

a second non-toxic food grade plastic member;

said first non-toxic food grade plastic member and said second non-toxic food grade plastic member forming a non-toxic food grade plastic humidifier cartridge;

an all natural membrane member device disposed between said first non-toxic food grade plastic member and said second non-toxic food grade plastic member;

said first non-toxic food grade plastic member is solid and is provided with a Velcro device for attaching said non-toxic food grade humidifier cartridge to an external glass or plastic container which is sealable;

distilled water introduced into said all natural membrane device; and said second non-toxic food grade plastic member is provided with a plurality of apertures therethrough for releasing moisture therethrough from said distilled water in said all natural membrane device within said non-toxic food grade plastic humidifier cartridge;

wherein said method comprises the steps of:

introducing said distilled water into said all natural membrane device;

placing a dried product in said external sealable container;

mounting said non-toxic food grade plastic humidifier in said external sealable container;

maintaining said non-toxic food grade plastic humidifier inside said external sealable container until said product is moist enough for the liking of an user;

removing said non-toxic food grade plastic humidifier from said external sealable container;

air drying said non-toxic food grade plastic humidifier; and repeating the foregoing steps as desired.

The method of using a non-toxic food grade plastic humidifier as described hereinabove may also include the step of injecting said distilled water into said all natural membrane device using a pipette.

The method of using a non-toxic food grade plastic humidifier may include the step of soaking said non-toxic food grade plastic humidifier cartridge in distilled water in an external dish with said second non-toxic food grade plastic member facing downwardly so that said plurality of apertures contact the distilled water.

The method of using a non-toxic food grade plastic humidifier as described above, wherein said second non-toxic food grade plastic member is provided with a screen member for releasing moisture therethrough from said distilled water in said all natural membrane device within said non-toxic food grade plastic humidifier cartridge, may include the step of soaking said non-toxic food grade plastic humidifier cartridge in distilled water in an external dish with said screen member facing downwardly so that said screen member contacts the distilled water in the external dish.

Any and all such changes, modifications, variations and other uses and applications which do not depart from the spirit and scope of the present invention are therefore covered by and embraced within the patent claims set forth hereinbelow.

The invention claimed is:

1. A non-toxic food grade plastic humidifier, comprising, in combination:

a first non-toxic food grade plastic member;

a second non-toxic food grade plastic member;

said first non-toxic food grade plastic member and said second non-toxic food grade plastic member forming a non-toxic food grade plastic humidifier cartridge;

an all natural membrane device disposed between said first non-toxic food grade plastic member and said second non-toxic food grade plastic member;

said first non-toxic food grade plastic member is solid and is provided with means for attaching said non-toxic food grade plastic humidifier cartridge to an external glass or plastic container which is sealable;

distilled water introduced into said all natural membrane device; and said second non-toxic food grade plastic member is provided with a plurality of apertures therethrough for releasing moisture therethrough from said distilled water in said all natural membrane device within said non-toxic food grade plastic humidifier cartridge.

2. The non-toxic food grade plastic humidifier of claim 1, wherein:

said external sealable container comprises a prescription pill bottle.

3. The non-toxic food grade plastic humidifier of claim 1, wherein:

said external sealable container comprises a zip lock bag.

4. The non-toxic food grade humidifier of claim 1, wherein:

said external sealable container comprises a pipe tobacco jar.

5. The non-toxic food grade plastic humidifier of claim 1, including:

a pipette for introducing said distilled water into said all natural membrane device.

6. The non-toxic food grade plastic humidifier of claim 1, including:

said second non-toxic food grade plastic member is provided with a screen member for releasing moisture therethrough from said distilled water in said all natural membrane device within said non-toxic food grade plastic humidifier cartridge.

7. The non-toxic food grade plastic humidifier of claim 2, including:

said second non-toxic food grade plastic member is provided with a screen member for releasing moisture therethrough from said distilled water in said all natural membrane device within said non-toxic food grade plastic humidifier cartridge.

8. The non-toxic food grade plastic humidifier of claim 3, including:
said second non-toxic food grade plastic member is provided with a screen member for releasing moisture therethrough from said distilled water in said all natural membrane device within said non-toxic food grade plastic humidifier cartridge.

9. The non-toxic food grade plastic humidifier of claim 4, including:
said second non-toxic food grade plastic member is provided with a screen member for releasing moisture therethrough from said distilled water in said all natural membrane device within said non-toxic food grade plastic humidifier cartridge.

10. The non-toxic food grade plastic humidifier of claim 1, wherein:
said all natural membrane device is squeezed between said first non-toxic food grade plastic member and said second non-toxic food grade plastic member.

11. The non-toxic food grade plastic humidifier of claim 2, wherein:
said all natural membrane device is squeezed between said first non-toxic food grade plastic member and said second non-toxic food grade plastic member.

12. The non-toxic food grade plastic humidifier of claim 3, wherein:
said all natural membrane device is squeezed between said first non-toxic food grade plastic member and said second non-toxic food grade plastic member.

13. The non-toxic food grade plastic humidifier of claim 4, wherein:
said all natural membrane device is squeezed between said first non-toxic food grade plastic member and said second non-toxic food grade plastic member.

14. The non-toxic food grade plastic humidifier of claim 9, wherein:
said all natural membrane device is squeezed between said first non-toxic food grade plastic member and said second non-toxic food grade plastic member.

15. A kit of components, comprising:
a kit container holding the following items;
a non-toxic food grade plastic humidifier comprising: a first non-toxic food grade plastic member; a second non-toxic food grade plastic member; said first non-toxic food grade plastic member and said second non-toxic food grade plastic member forming a non-toxic food grade plastic humidifier cartridge; an all natural membrane device disposed between said first non-toxic food grade plastic member and said second non-toxic food grade plastic member; said first non-toxic food grade plastic member is solid and is provided with means for attaching said non-toxic food grade humidifier cartridge to an external glass or plastic container which is sealable; and said second non-toxic food grade plastic member is provided with a plurality of apertures therethrough for releasing moisture therethrough from distilled water in said all natural membrane device within said non-toxic food grade plastic humidifier cartridge;
a pipette for injecting distilled water into said all natural membrane; and
an instruction sheet for giving an user instructions for using said kit of components.

16. The kit of components of claim 15, wherein:
said second non-toxic food grade plastic member is provided with a screen member for releasing moisture therethrough from said distilled water in said all natural membrane device within said non-toxic food grade plastic humidifier cartridge.

* * * * *